(12) United States Patent
Kitamura

(10) Patent No.: US 7,209,967 B2
(45) Date of Patent: Apr. 24, 2007

(54) DYNAMIC LOAD BALANCING OF A STORAGE SYSTEM

(75) Inventor: Manabu Kitamura, Cupertino, CA (US)

(73) Assignee: Hitachi, Ltd., Tokyo (JP)

( * ) Notice: Subject to any disclaimer, the term of this patent is extended or adjusted under 35 U.S.C. 154(b) by 59 days.

(21) Appl. No.: 10/858,717

(22) Filed: Jun. 1, 2004

(65) Prior Publication Data

US 2005/0267950 A1 Dec. 1, 2005

(51) Int. Cl.
G06F 15/173 (2006.01)
G06F 15/16 (2006.01)

(52) U.S. Cl. ............................. 709/225; 709/235

(58) Field of Classification Search ......... 709/223–228
See application file for complete search history.

(56) References Cited

U.S. PATENT DOCUMENTS

| | | | |
|---|---|---|---|
| 6,078,960 A * | 6/2000 | Ballard | 709/229 |
| 6,173,306 B1 * | 1/2001 | Raz et al. | 718/102 |
| 6,237,063 B1 | 5/2001 | Bachmat et al. | |
| 6,292,822 B1 * | 9/2001 | Hardwick | 718/105 |
| 6,708,252 B2 | 3/2004 | Yamamoto et al. | |
| 6,711,559 B1 * | 3/2004 | Kogota et al. | 707/1 |
| 7,023,813 B2 * | 4/2006 | Newberg et al. | 370/312 |
| 2002/0124137 A1 * | 9/2002 | Ulrich et al. | 711/113 |
| 2002/0133491 A1 * | 9/2002 | Sim et al. | 707/10 |
| 2002/0152322 A1 * | 10/2002 | Hay | 709/245 |
| 2002/0161855 A1 | 10/2002 | Manczak et al. | |
| 2003/0110237 A1 | 6/2003 | Kitamura et al. | |
| 2003/0120751 A1 * | 6/2003 | Husain et al. | 709/219 |
| 2003/0126518 A1 * | 7/2003 | Binger | 714/48 |
| 2003/0153994 A1 * | 8/2003 | Jin et al. | 700/99 |
| 2004/0088410 A1 * | 5/2004 | Flynn et al. | 709/225 |
| 2005/0038890 A1 | 2/2005 | Masuda et al. | |
| 2006/0031506 A1 * | 2/2006 | Redgate | 709/226 |
| 2006/0080388 A1 * | 4/2006 | Cherkasova et al. | 709/203 |

OTHER PUBLICATIONS

"EMC Celerra CNS Series Network Attached Storage," product data sheet EMC Corporation Hopkinton, MA (2003, 2004).

* cited by examiner

Primary Examiner—Beatriz Prieto
Assistant Examiner—Michael D. Meucci
(74) Attorney, Agent, or Firm—Townsend and Townsend and Crew LLP

(57) ABSTRACT

A storage system coupled to a plurality of clients via a communication link includes a first file server including a first switching module and a first resource manager, the first resource manager configured to maintain a first resource table that provides mapping information; a second file server including a second switching module and a second resource manager, the second resource manager configured to maintain a second resource table that provides mapping information; a storage unit including a storage area of first type that is assigned to the first file server and a storage area of second type that is assigned to the second file server, the storage area of first type including a plurality of file systems, each file system having an Internet Protocol (IP) address. The storage area of first type includes first, second, and third file systems having first, second, and third IP addresses, respectively. The first resource table includes first load information, second load information, and third load information that indicate workloads of the first, second, and third file systems, respectively. The first switching module is configured to detach the first file system, so that the first file system could not be accessed by the first file server if it is determined that a workload of the first filer server is heavy.

22 Claims, 12 Drawing Sheets

Fig. 4

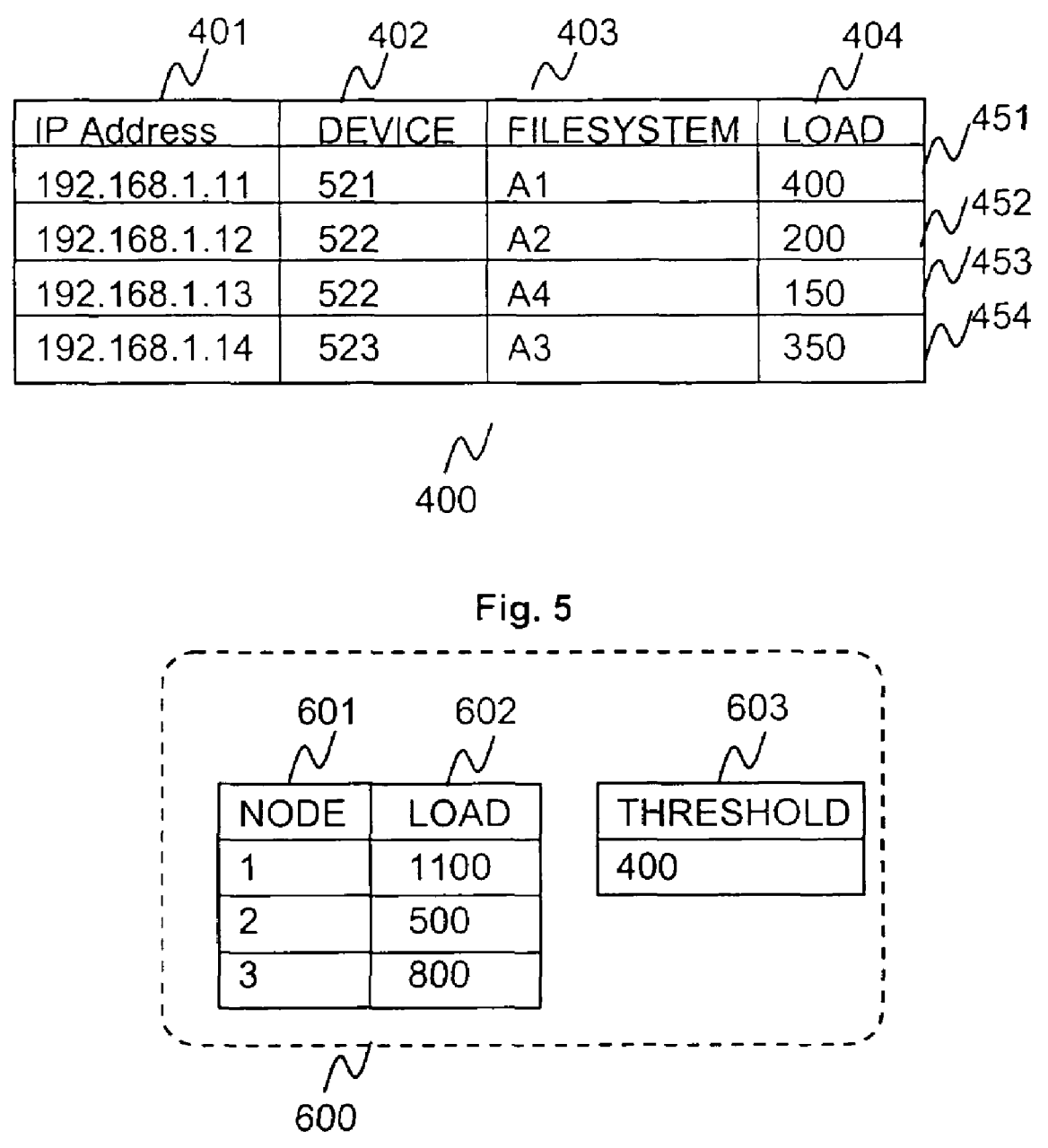

| IP Address | DEVICE | FILESYSTEM | LOAD |
|---|---|---|---|
| 192.168.1.11 | 521 | A1 | 400 |
| 192.168.1.12 | 522 | A2 | 200 |
| 192.168.1.13 | 522 | A4 | 150 |
| 192.168.1.14 | 523 | A3 | 350 |

Fig. 5

| NODE | LOAD |
|---|---|
| 1 | 1100 |
| 2 | 500 |
| 3 | 800 |

| THRESHOLD |
|---|
| 400 |

Fig. 9
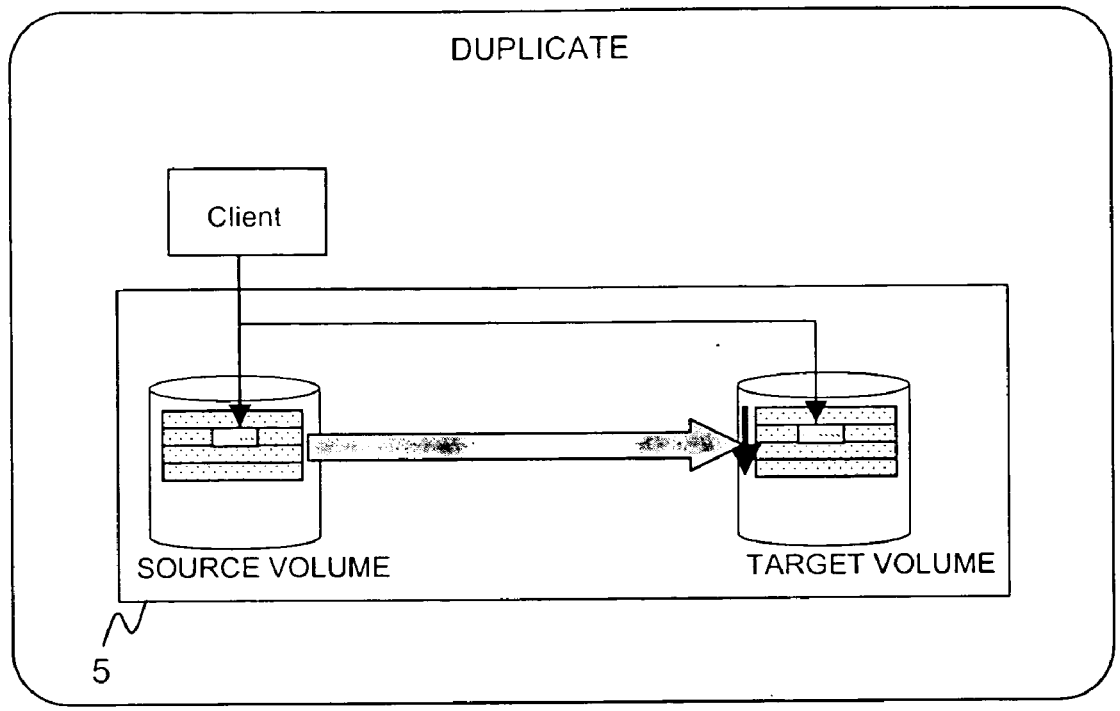
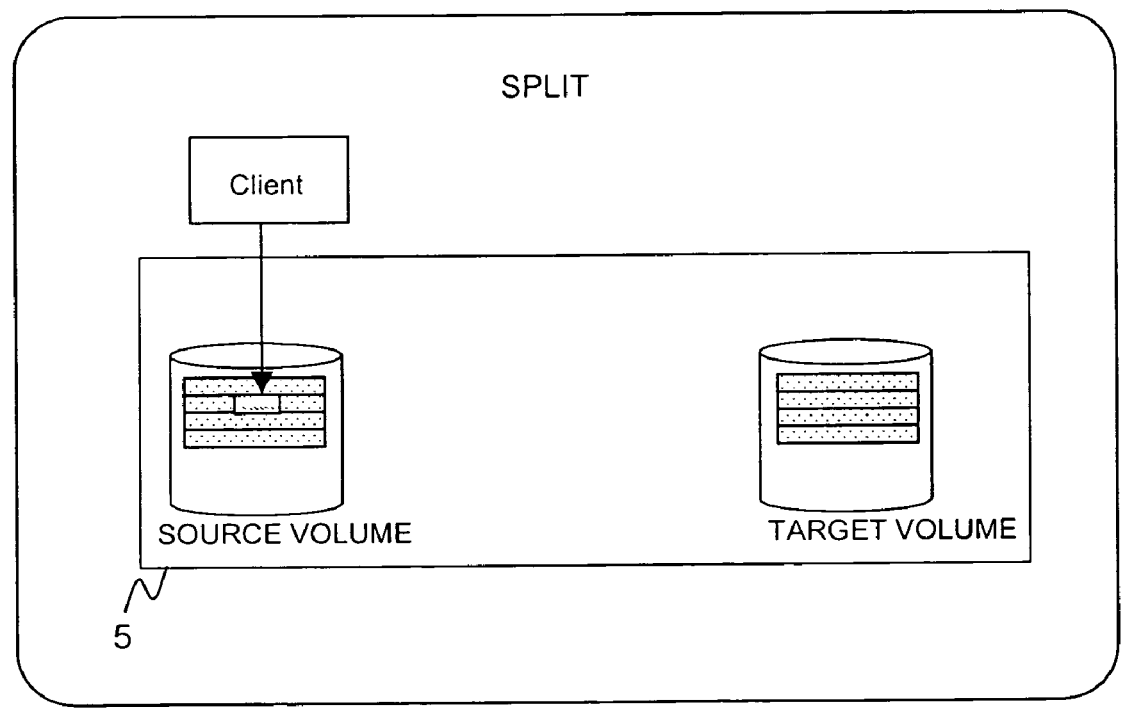

DYNAMIC LOAD BALANCING OF A STORAGE SYSTEM

BACKGROUND OF THE INVENTION

The present invention relates to a storage system, more specifically, dynamic load balancing in a storage system having a plurality of host interfaces and processors.

Data is the underlying resources on which all computing processes are based. With the recent explosive growth of the Internet and e-business, the demand on data storage systems has increased tremendously. Generally, storage networking encompasses two applications or configurations: network-attached storage (NAS) or storage area network (SAN). A NAS uses IP over Ethernet to transports data in file formats between storage servers and their clients. In NAS, an integrated storage system, such as a disk array or tape device, connects directly to a messaging network through a local area network (LAN) interface, such as Ethernet, using messaging communications protocols like TCP/IP. The storage system functions as a server in a client-server system.

Generally, a SAN is a dedicated high performance network to move data between heterogeneous servers and storage resources. Unlike NAS, a separate dedicated network is provided to avoid any traffic conflicts between client and servers on the traditional messaging network. A SAN permits establishment of direct connections between storage resources and processors or servers. A SAN can be shared between servers or dedicated to a particular server. It can be concentrated in a single locality or extended over geographical distances. SAN interfaces can be various different protocols, such as Fibre Channel (FC), Enterprise Systems Connection (ESCON), Small Computer Systems Interface (SCSI), Serial Storage Architecture (SSA), High Performance Parallel Interface (HIPPI), or other protocols as they emerge in the future. For example, the Internet Engineering Task Force (IETF) is developing a new protocol or standard iSCSI that would enable block storage over TCP/IP, while some companies are working to offload the iSCSI-TCP/IP protocol stack from the host processor to make iSCSI a dominant standard for SANs.

Regardless of the types of storage system used, storage systems are increasingly required to store larger capacity and provide higher performance. To satisfy these requirements, the storage controllers for the enterprise or midrange storage systems have been provided with a plurality of processors. For example, Hitachi Lightning 9900™ comprises a plurality of Client-Host Interface Processors (CHIPs) to process multiple concurrent input and output request ("I/Os").

One issue of a NAS system is that the load balancing among multiple processors may be difficult. Sharing a volume or file system among multiple NAS processors (the processors that processes NFS/CIFS requests) may be difficult since a NAS processor caches the accessed data in their memory. This tends to make it difficult to maintain coherency or consistency for the cached data since there are multiple processors. Therefore, a file access request is generally processed one NAS processor at a time, not fully utilizing the multiple processors. Accordingly, among other features, it would be desirable to provide a good load balancing among multiple processors.

BRIEF SUMMARY OF THE INVENTION

The present invention relates to load balancing of a storage system or subsystem, e.g., in a network attached storage system (or NAS system) having a plurality of processors for processing access requests.

In one embodiment, a storage system includes a plurality of processors to process access requests, a plurality of volumes to store data, and interconnecting means to connect the plurality of processors and the plurality of volumes to each other. Each volume is assigned to one of the processors. The processor mounts the file systems in the volume, and an IP address is associated with each file system. When the load of one of the processors becomes heavier than other processors, one or more volumes (or file systems) that were assigned to the processor that is experiencing the heavier load is unmounted. The IP address corresponding to the unmounted volume is disabled from the processor. The volume and the IP address are reassigned to another processor whose load is lighter.

In one embodiment, a storage system coupled to a plurality of clients via a communication link includes a first file server including a first switching module and a first resource manager, the first resource manager configured to maintain a first resource table that provides mapping information; a second file server including a second switching module and a second resource manager, the second resource manager configured to maintain a second resource table that provides mapping information; a storage unit including a storage area of first type that is assigned to the first file server and a storage area of second type that is assigned to the second file server, the storage area of first type including a plurality of file systems, each file system being associated with an Internet Protocol (IP) address. The storage area of first type includes first, second, and third file systems are associated with first, second, and third IP addresses, respectively. The first resource table includes first load information, second load information, and third load information that indicates workloads of the first, second, and third file systems, respectively. The first switching module is configured to detach the first file system, so that the first file system could not be accessed by the first file server if it is determined that a workload of the first filer server is heavy.

In another embodiment, a method for performing load balancing of a storage system is disclosed. The system includes a console, first, second, and third file servers and a storage unit having a plurality of logical volumes. The method comprises accessing a workload table maintained by a system manger of the console, the console being coupled to the storage system via a communication link, the workload table providing workloads of the first, second, and third file servers in the storage system; determining a workload difference between a file server with the heaviest workload and a file server with the lightest workload according to the workload table, the file server with the heaviest workload being the first file server and the file server with the lightest workload being the second file server; and selecting a first file system associated with the first file server to be detached from the first file server if the workload difference exceeds a given value, the first file system being associated with an Internet Protocol (IP) address; determining whether or not a given logical volume wherein the first file system to be detached includes another file system. The method further includes if the given logical volume does not include another file system, stop exporting of the first file system to a client that is coupled to the storage system, and unmounting the first file system. On the other hand, if the given logical volume includes another file system, providing a copy of the first file system to a backup logical volume, stop exporting the first file system to the client, and unmounting the first file system.

In the method, the first file system is selected to be detached from the first file server if the system manager determines that moving the first file system from the first file server to the second file server would equalize workloads of the first and second file server more than moving any other file system that is associated with the first file server.

In another embodiment, a storage system includes a computer program and first, second, and third file servers. The storage system further includes a console and a storage unit having a plurality of logical volumes. The computer program comprises code for accessing a workload table maintained by a system manger of the console, the console being coupled to the storage unit and first, second, and third file servers via a network, the workload table providing workloads of the first, second, and third file servers in the storage system; code for determining a workload difference between a file server with the heaviest workload and a file server with the lightest workload according to the workload table, the file server with the heaviest workload being the first file server and the file server with the lightest workload being the second file server; code for selecting a first file system associated with the first file server to be detached from the first file server if the workload difference exceeds a given value, the first file system being associated with an Internet Protocol (IP) address; code for determining whether or not a given logical volume wherein the first file system to be detached includes another file system. The program also includes code for stop exporting of the first file system to a client that is coupled to the storage system, and code for unmounting the first file system, if the given logical volume does not include another file system. The program further includes code for providing a copy of the first file system to a backup logical volume, code for stop exporting the first file system to the client, and code for unmounting the first file system, if the given logical volume includes another file system.

BRIEF DESCRIPTION OF THE DRAWINGS

FIG. 4 shows a volume mapping table according to one embodiment of the present invention.

FIG. 5 illustrates a workload table maintained by a system manager according to one embodiment of the present invention.

FIG. 9 illustrates a mirroring operation according to one embodiment of the present invention.

DETAILED DESCRIPTION OF THE INVENTION

Figure 1:
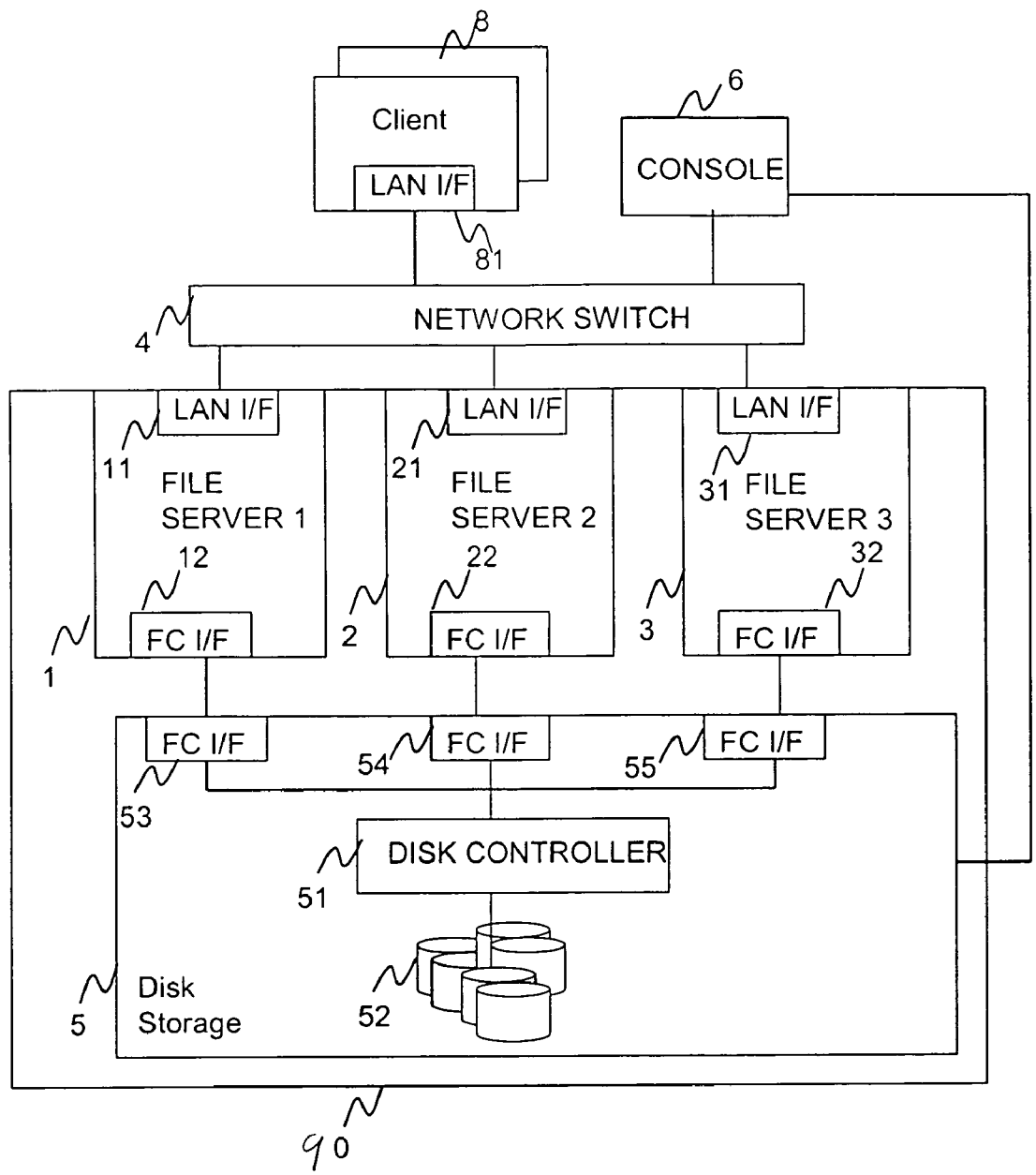
FIG. 1 illustrates a storage system according to one embodiment of the present invention.

FIG. 1 illustrates a storage system 90 according to one embodiment of the present invention. The storage system is a file server system in the present embodiment. File server system 90 is composed of a plurality of file servers 1, 2, and 3, and a disk storage 5. The file server may be a processor, e.g., a NAS processor, or module that is provided within the same housing as the disk storage. For example, the file server system is a disk array unit or subsystem including the file servers and disk storage. Alternatively, the file servers may be computer systems that are provided remotely from the disk storage.

One or more clients 8 are coupled to the storage system via a network 4. Each client includes a local area network (LAN) interface 81 that is coupled to the network. The clients or hosts send requests and commands to the storage subsystem. A console 6 is used to manage the storage system. In one embodiment, the console is remotely located and coupled to storage system 90 via the network 4. In another embodiment, the console may be integrated to the storage system or provided in a close proximity of the storage subsystem, in which case the console communicates with the storage system via a dedicated cable. The console may also communicate with the storage system via a wireless network.

In the present embodiment, file servers 1, 2, and 3 include local area network (LAN) interfaces 11, 21, and 31, respectively, for receiving file access requests from clients 8. The file servers 1, 2, and 3 also include Fibre Channel interfaces (FC I/F) 12, 22, and 32, respectively, to access disk storage 5. Each file server also includes a central processing unit (CPU) and a memory (not shown), as well as the programs for handling the file access requests.

Disk storage 5 includes a disk controller 51, a plurality of disks 52, and a plurality of Fibre Channel interfaces (FC I/F) 53, 54, and 55. The disk storage is coupled to the file servers via FC I/F 53, 54, and 55. As explained above, in one embodiment, the storage system 90 is a storage subsystem or disk array unit having a plurality of disk drives, where the file servers are provided within the same housing of the subsystem or disk array unit. In another embodiment, the storage system 90 comprises a plurality of remotely located device (e.g., a distributed system), where the disk storage is the storage subsystem or disk array unit, and the file servers are hosts coupled to the disk storage via a network.

Figure 2:
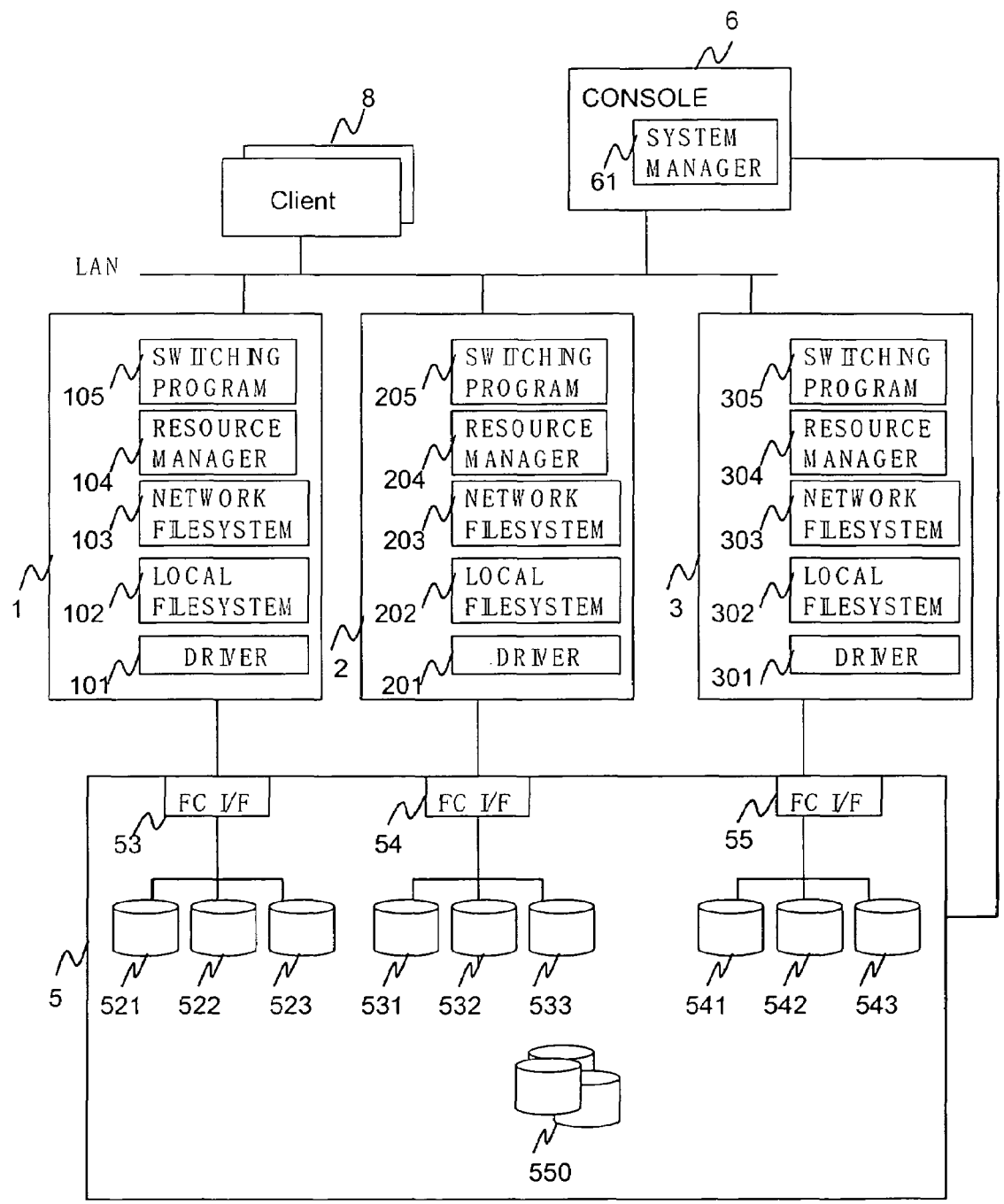
FIG. 2 illustrates a functional diagram of the file server system of FIG. 1 according to one embodiment of the present invention.

FIG. 2 illustrates a functional diagram of the file server system 90 according to one embodiment of the present invention. Each file server 1, 2, or 3 includes a driver 101, 201, or 301, a local file system 102, 202, or 302, a network file system 103, 203, or 303, a resource manager 104, 204, or 304, and a switching program 105, 205, or 305 (also referred to as "switching program module").

The storage volumes above are denoted by numerals 521, 522, 523, 531, 532, 533, 541, 542, and 543. These volumes are defined by disk controller 51 of the storage system 90.

Drivers 101, 201, and 301 and local file systems 102, 202, and 302 are used for accessing the storage volumes. That is, driver 101 and local file system 102 cooperate with each to access the storage volumes that are associated with FC interface 53. Driver 201 and local file system 202 cooperate with each other to access the storage volumes that are associated with FC interface 54. Driver 301 and local file system 302 cooperate with each other to access the storage volumes that are associated with FC interface 55. Network file systems 103, 203, and 303 process the file access requests received from clients 8 in accordance with NFS (Network File System) or CIFS (Common Internet File System) protocol.

Each resource manager 104, 204, or 304 measures the load of each file server 1, 2, or 3, respectively, and reports to a system manager 61 in console 6. Switching programs 105, 205, and 305 are used for migrating part of the load of each file server 1, 2, or 3 to another file servers 1, 2, or 3. This is done by transferring a file system or volume from one file server to another, as explained in more detail later.

As explained above, disk controller 51 defines a plurality of storage volumes using disks 52. The storage volumes are commonly referred to as logical volumes in the art since they are logical partitions, rather than not physical partitions. Disk controller 51 also assigns each of the logical volumes to one of FC interfaces 53, 54, and 55 to enable a file server associated with that FC interface to access the logical volume. This assignment process is referred to as volume mapping in the present embodiment. Of course other terms may be used to refer to this process.

A logical volume may be assigned to more than one FC interfaces. However, for illustrative purposes, this embodiment is described with assumption that each logical volume is assigned to only one of FC interface.

In the present embodiment, logical volumes 521, 522, and 523 are assigned to FC I/F 53, logical volumes 531, 532, and 533 are assigned to FC I/F 54, and logical volumes 541, 542, and 543 are assigned to FC I/F 55. In addition, the disk storage includes unused logical volumes 550, i.e., backup volumes, that are normally not assigned to any of the FC I/Fs. They are used or assigned as a need arises. For example, the backup volume may be used to store a copy of a file system to be reassigned to another file server, as explained later. The disk controller 51 generally performs the volume mapping operation when system manager 61 of the console issues such a command to disk storage 5.

Figure 3:
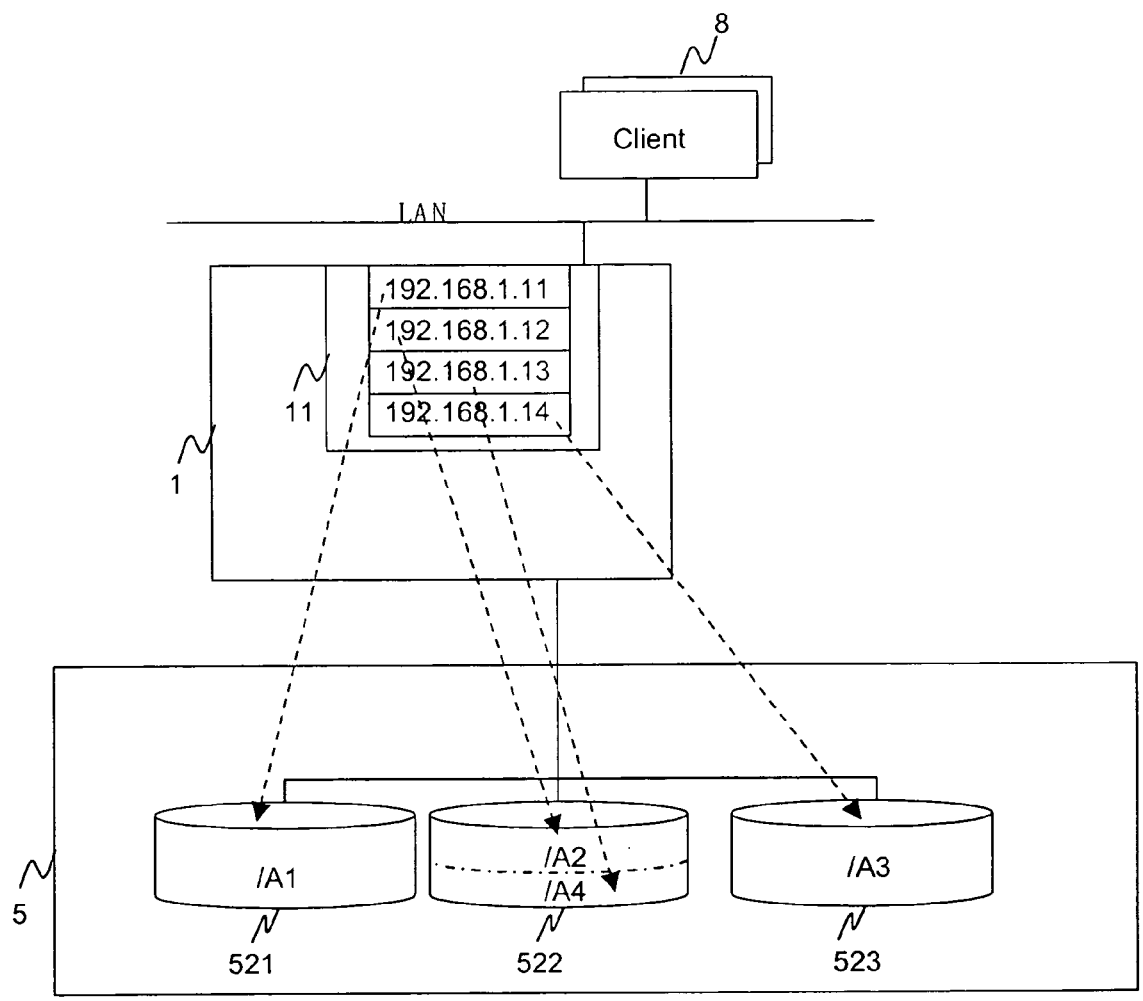
FIG. 3 shows a file server and its LAN I/F according to one embodiment of the present invention.

FIG. 3 shows a file server and its LAN I/F according to one embodiment of the present invention. Each LAN I/F 11, 21, or 31 of the file server has one or more IP addresses according to the present embodiment. Each IP address is uniquely associated with one of the file systems that is assigned to the file server. LAN I/F 11 of file server 1 is representatively illustrated in FIG. 3. LAN I/F 11 has four IP addresses of the file systems that are assigned to file server 1, i.e., file systems A1, A2, A3, and A4. These file systems may also be considered as being assigned to LAN I/F 11. As illustrated, one or more file systems may be provided in a given logical volume in the present embodiment.

Before the clients 8 can access the file system A1 that resides in the logical volume 521, users instruct the clients 8 to mount the file system A1. The following is an exemplary command used to mount the file system: mount 192.168.1.11:/A1/usr1. In the mount operation, a host name (i.e., the name of a file server) may be used instead of IP address. After the mount operation, clients 8 can access the file system A1 using NFS protocol.

FIG. 4 shows a volume mapping table 400 according to one embodiment of the present invention. The table is used to manage the mapping between the IP address and file system, mapping between logical volumes and file systems. The table also indicates the current workload of each file system that is assigned to a given file server. Accordingly, the table may also be referred to as "a resource table." Each resource manager 104, 204, or 304 manages such a table and periodically transmits the contents of the table to system manager 61 that is provided in the console.

More specifically, the table includes a plurality of records or entries 451, 452, 453, and 454. Each record or entry corresponds to a file system. These records provide mapping information and load information that are referred to above since each record is associated with an IP address field 401, a device field 402, a file system field 403, and a load field 404.

The IP address field shows the IP addresses assigned to the LAN I/F 11, 21, or 31. Host names (i.e., the file server names) can also be used instead of IP addresses. The device field indicates logical volume numbers. Each logical volume in the disk storage is provided with its own identification number. The file system field indicates the name of the file system that resides in the logical volume specified in the device field. For example, the record 451 indicates that the file system A1 is defined in the logical volume 521 and is assigned the IP address of 192.168.1.11.

The load field 404 indicates the current workload for a given file system in terms of I/O per second (IOPS) in the present embodiment. As the name suggests, IOPS provides information as to the number of disk I/Os received per second by a given file system. For example, the record 451 indicates that 400 IOPS are directed to the file system A1. Each resource manager 104, 204, or 304 periodically (e.g. once in a second) measures the workload for a given file system, and records the value of the workload to the volume mapping table 400.

Referring to FIG. 5, system manager 61 creates a workload table 600 by collecting information from the volume mapping table 400 of each file server 1, 2, 3. A node field 601 includes the identifier of each file server 1, 2, or 3. A load field 602 indicates the workload of each file server. The value for the load field is obtained by summing the workloads of all file systems that are managed by a given file server. For example, file server 1 manages four file systems (FIG. 4). The workload for each file system is 400, 200, 150, 350, respectively. The value for the load field, therefore, is 1100, which indicates the total workload of file server 1. This calculation may be done at the file server level or system manger level according to the implementation.

A threshold field 603 indicates a predefined value. Generally this value is set by an administrator. In the present embodiment, the threshold value is 400. That is, if the difference between the most busiest file server (whose workload is heaviest) and the least busiest file server (whose workload is lightest) exceeds the threshold value, the file server system 90 initiates the load balancing operation. The process of the load balancing operation is described below.

Figure 6:
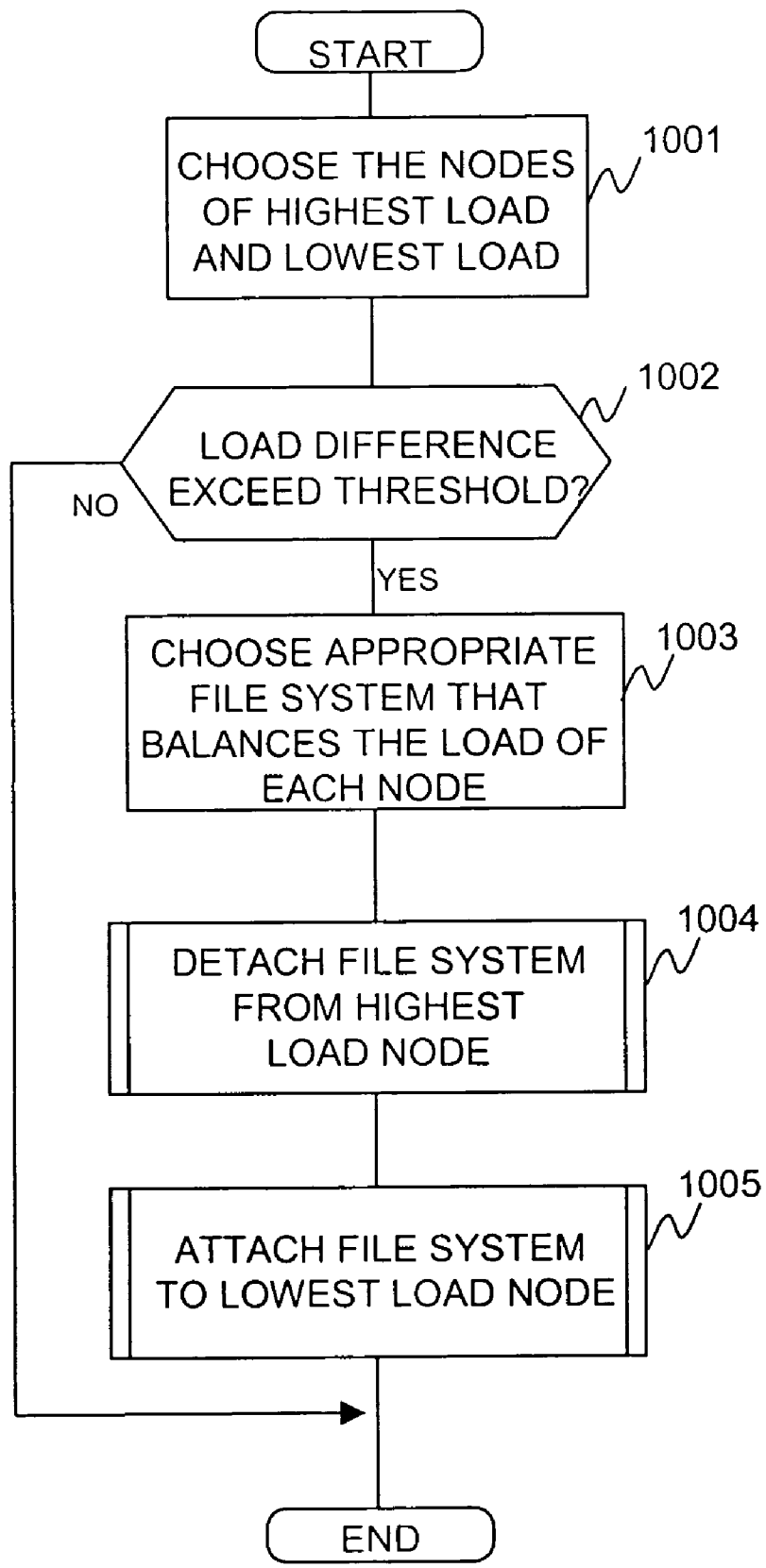
FIG. 6 illustrates a process performed by a system manager in a console according to one embodiment of the present invention.
Figure 7:
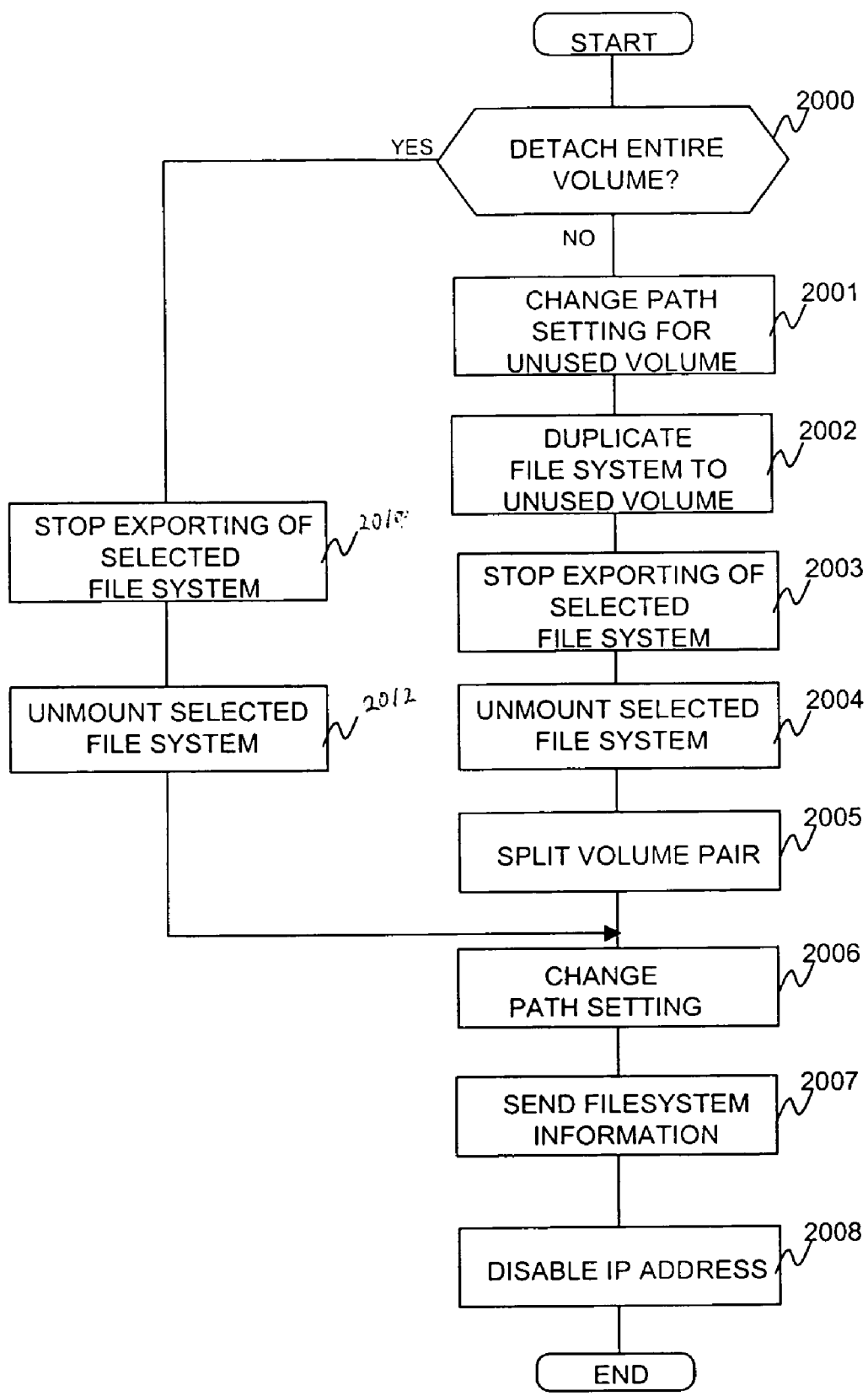
FIG. 7 illustrates a process for detaching a file system from a file server according to one embodiment of the present invention.
Figure 8:
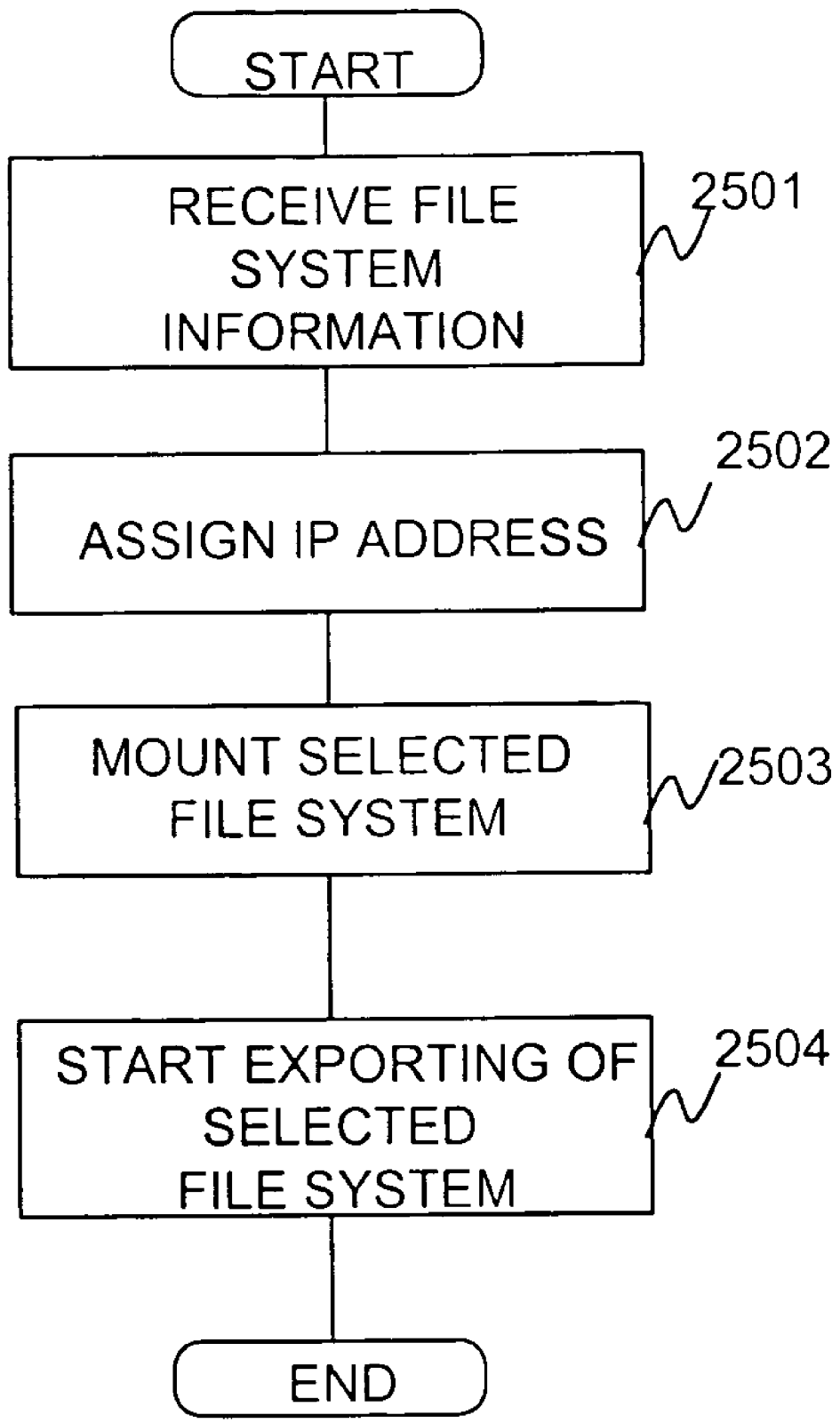
FIG. 8 illustrates a process for attaching a file system according to one embodiment of the present invention.

FIGS. 6, 7, and 8 illustrate processes performed by file server system 90 to balance the loads of the file servers 1, 2, and 3 according to one embodiment of the present invention. FIG. 6 illustrates a process performed by system manager 61 of the console. System manager 61 executes this process periodically (e.g. once an hour). At step 1001, nodes or file servers that are experiencing the heaviest and lightest loads in the system 90 are selected by examining the workload table. The difference between the loads of these file servers are determined, i.e., the difference value of IOPS from table 600. System manager 61 then determines whether or not the difference value exceeds the threshold value as defined in table 600 (step 1002). If the difference exceeds the threshold value of 400 in the present implementation, the process proceeds to step 1003. Otherwise, the process ends.

At step 1003, the system manger chooses an appropriate file system in the file server with the heaviest load in order to balance the workload of these file servers. Below provides a rule/algorithm for choosing an appropriate file system for reassignment according to one embodiment of the present invention.

1. Select a file system from a first file server, i.e., the file server with the heaviest load, and move the selected file system to a second file server, i.e., the file server with the lightest load. Then estimate the resulting workloads of the first and second file servers.
2. If the estimated workload of the first file server is equal to the estimated workload of the second file server, the system manager determines that the selected the file system should be moved. Otherwise, another file system is selected from the first file server and so on.
3. If there is no file system that matches the condition (2), the file system from the first file server that would make the estimated workload of the first file server the closest to that of the second file server is moved to the second file server.

For example, if the workloads of file server 1, 2, and 3 are as indicated in FIG. 5 and the workloads of the file systems are as indicated in FIG. 4, the file system A3 of file server 1 is moved to file server 2. The difference in workloads of the file servers 1 and 2 is changed from 600 IOPS to 100 IOPS after file system A3 has been moved to file server 2.

Referring back to the process, at step 1004, system manager 61 instructs the file server 1 to detach the file system A3. The steps involved in detaching a file system is provided in FIG. 7.

After the file system A3 has been detached, system manager 61 instructs the file server 2 to attach the file system A3 in the file server 2 (step 1005). The steps involved in attaching a file system is provided in FIG. 8.

FIG. 7 illustrates a process for detaching a file system from a file server according to one embodiment of the present invention. This detachment process is executed by a switching program in a file server in the present embodiment. The detachment process is described herein using the above example, where file server 1 is the file server with the heaviest load and file server 2 is the file server with the lightest load, where file system A3 is moved from file server 1 to file server 2.

At step 2000, switching program 105 of file server 1 determines whether or not the entire logical volume wherein the selected file system (e.g., filer system A3) resides is to be detached. That is, whether or not the logical volume in question has any other file system defined therein. If another file system resides in the volume, switching program 105 determines that only a portion of the volume should be detached and proceeds to step 2001.

On the other hand, it there is no other file system that is defined in the volume, switching program 105 determines that it should detach the entire volume since the selected file system corresponds to the entire volume. The process then proceeds to step 2010 and then to step 2012. These steps correspond to steps 2003 and 2004 explained below.

At step 2001, switching program 105 instructs system manager 61 to change the volume mapping so that file server 1 can access one of the unused logical volumes, e.g., volume 550 (see FIG. 2). Switching program 105 selects that unused logical volume or backup volume and duplicates the selected file system to the backup volume (step 2002). For this purpose, switching program 105 initiates a volume mirroring operation or function. Disk storage 75, in response, performs the volume mirroring operation. The mirroring operation is described in more details below in connection with FIG. 9.

At step 2003, switching program 105 instructs the network file system 103 to stop exporting the selected file system. The export of the file system is stopped by disabling the communication between clients 8 and network file system 103. That is, the file server 1 is instructed not to allow clients 8 to access the file system via NFS or CIFS. Switching program 105 instructs the local file system 102 to unmount the selected file system (step 2004). The file system is unmounted by disabling the communication between local file system 102 and FC interface 53 of the selected logical volume. Switching program 105 splits the pair status of the selected volume and the backup volume (step 2005). Once unmounted, the clients 8 cannot access the selected volume so the contents of the selected volume and the backup volume remain the same.

At step 2006, switching program 105 instructs system manager 61 to change the volume mapping so that file server 2 can access the backup volume wherein the copy of the file system A3 resides.

Switching program 105 sends the information about the selected file system A3 to the system manager 61 (step 2007). The information about the selected file system includes the file system name, IP address associated with the file system, and the volume number that the backup volume wherein the copy of the selected file system resides. Switching program 105 then disables the IP address that is associated with the selected file system A3 (step 2008). At the same time, the entry 454 in the resource table 400 is also deleted. This is done on the resource table 400 maintained by switching program 105 according to the present embodiment.

Referring back to step 2000, if switching program 105 determines that entire volume is to be detached, the switching program stops exporting of the selected file system A3 (step 2010) without duplicating the file system. The file system is umounted as in step 2004 (step 2012). Thereafter, the volume mapping of the volume including the selected file system is changed (step 2006). That is, the volume that is mapped to the file server 1 or FC I/F 53 is re-mapped to the file server 2 or FC I/F 54. Steps 2007 and 2008 are then performed.

FIG. 8 illustrates a process for attaching a file system according to one embodiment of the present invention. The above example is continued to be used to describe the attachment process. At step 2501, switching program 205 of file server 2 receives from system manager 61 the information about the file system A3 that has been moved. When file system A3 in the file server 1 is moved to file server 2, the file system A3 is copied to the backup logical volume (assuming the volume 523 includes another file system), as explained above. In this case, system manager 61 informs the switching program 205 of the volume number of the backup volume wherein the copy of the file system A3 resides. Switching program 205 enables the received IP address in file server 2 by assigning the IP address to the file system A3 in its table 400 (step 2502). The file system is mounted (step 2503). Switching program 205 exports the file system A3 to enable the clients to resume accessing the file system A3 (step 2504).

FIG. 9 illustrates a mirroring operation according to one embodiment of the present invention. This mirroring operation is used to perform the attachment and detachment processes described above. Disk storage 5 has a volume mirroring function that creates a duplicate copy of all of a given logical volume (source volume) or a portion thereof to another logical volume (target volume), e.g., the backup volume 550. When users or the file servers 1, 2, and 3 instruct the disk storage 5 to make a duplicate copy of a specified region of the source volume, disk storage 5 starts copying that region of the source volume to the target volume sequentially (from the beginning to end of the desired portion). This operation is typically referred to as "an initial copy operation" since the target volume mirrors the source volume's initial state.

Thereafter, when the file servers 1, 2, and 3 write data to the specified region of the source volume, the write data are also copied to the target volume, so that the target volume continues to mirror the source volume. This subsequent operation is typically referred to as "an update copy operation." The state after the initial copy has been completed is typically referred to as "Duplicate State." In the present embodiment, the update copy operation may be performed only after the duplicate state has been obtained.

The file server system 90 is configured to allow users or the file servers 1, 2, and 3 to instruct disk storage 5 to stop the duplicate state. When the Disk Storage 5 is instructed to stop the duplicate state, the state is placed to the "Split State". That is, the two volumes are de-linked or no longer paired for mirroring. Accordingly, in split state, neither initial copy nor update copy operation can be performed. The above volume mirroring function may be used to provide duplicate copies of multiple file systems residing in a logical volume or a duplicate copy of entire source volume if only one file system is defined in the source volume.

Figure 10:
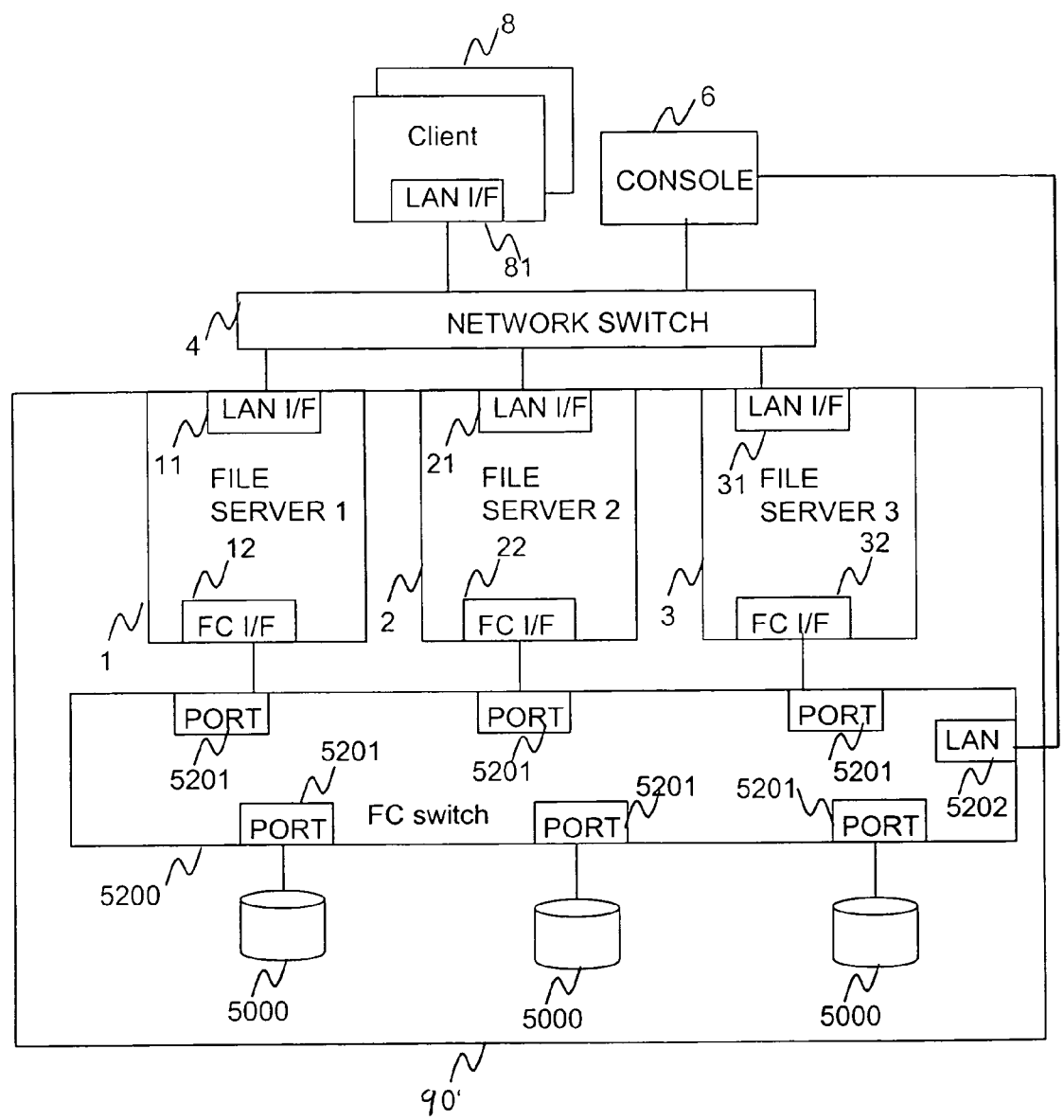
FIG. 10 illustrates a file server system according to another embodiment of the present invention.

FIG. 10 illustrates a file server system 90' according to another embodiment of the present invention. The configuration of the file server system 90' is substantially the same as that of the system 90 in FIG. 1. Some of the differences are that system 90' includes a plurality of disks 5000 and a Fibre Channel switch 5200 rather than disk storage 5 of system 90. The FC switch 5200 includes a plurality of ports 5201 that is coupled the file servers 1, 2, and 3, and disks 5000. The switch also includes a LAN 5202 that is coupled to the LAN interfaces of the file servers. The switch could be part of a storage area network in certain implementations.

Figure 11:
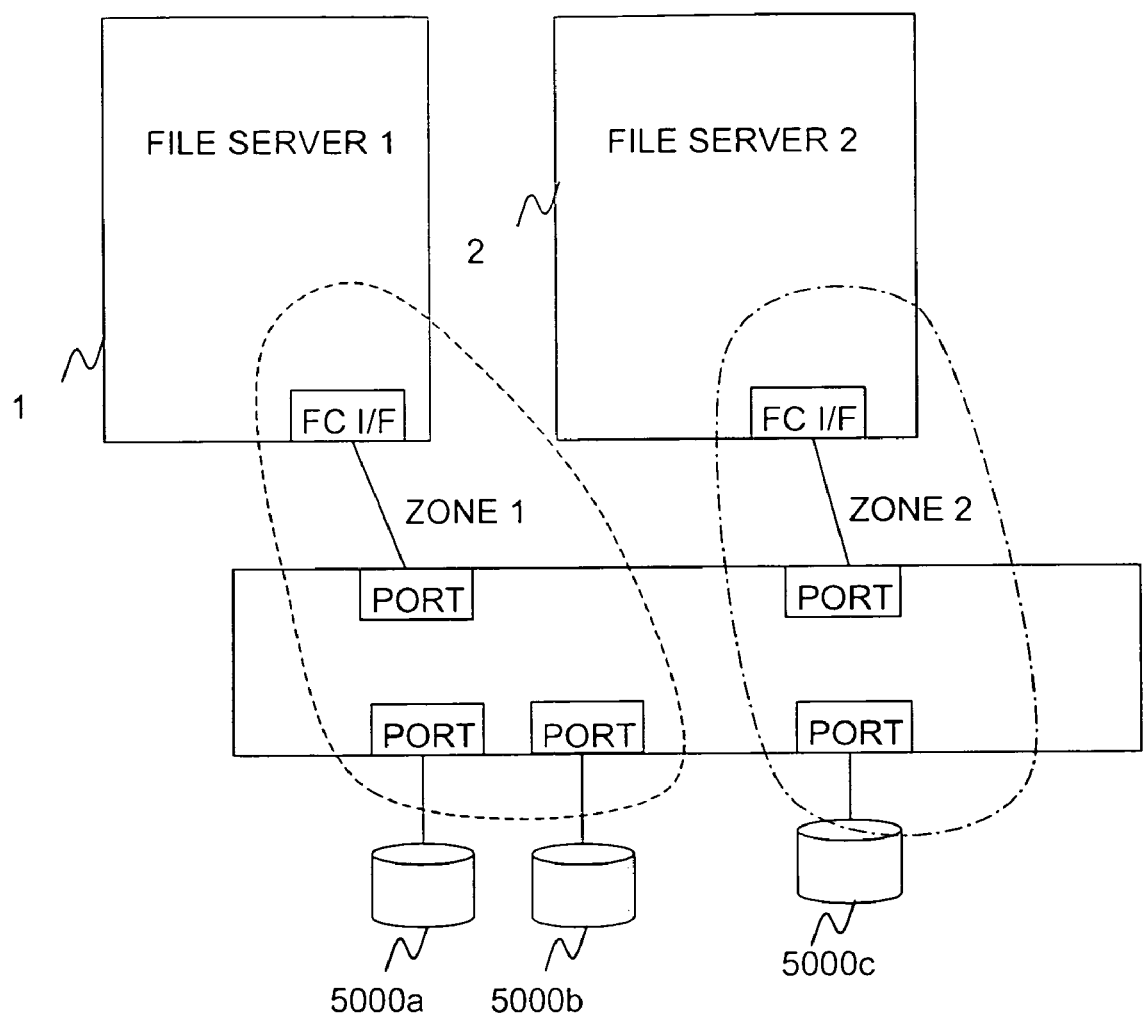
FIG. 11 illustrates the steps involved in the zoning function according to one embodiment of the present invention.

In system 90', instead of volume mapping in the disk storage 5, a zoning function associated with FC switch 5200 is used. FIG. 11 illustrates the steps involved in the zoning function according to one embodiment of the present invention. Zoning is the feature of the FC switch 5200 that assigns a given file server to a set of ports, so that the file server may communicate and access only the ports that have been assigned to it. That is, a "barrier" is created within the FC switch.

For example, in FIG. 11, the file server 1 is assigned to a set of ports in a zone referred to as ZONE 1. Disks 5000*a* and 5000*b* are also assigned to ZONE 1. On the other hand, file server 2 and disk 5000*c* are assigned to ZONE 2. These components are grouped respectively to their zones.

Once these components are grouped to a particular zone, the zoning feature prohibits the communication (for purposes of accessing data) between components in different zones. Accordingly, the file server 1 is allowed to use the ports in ZONE 1 to access disks 5000*a* and 5000*b*, but is not allow to access the ports in ZONE 2 to access disk 500*c*.

Figure 12:
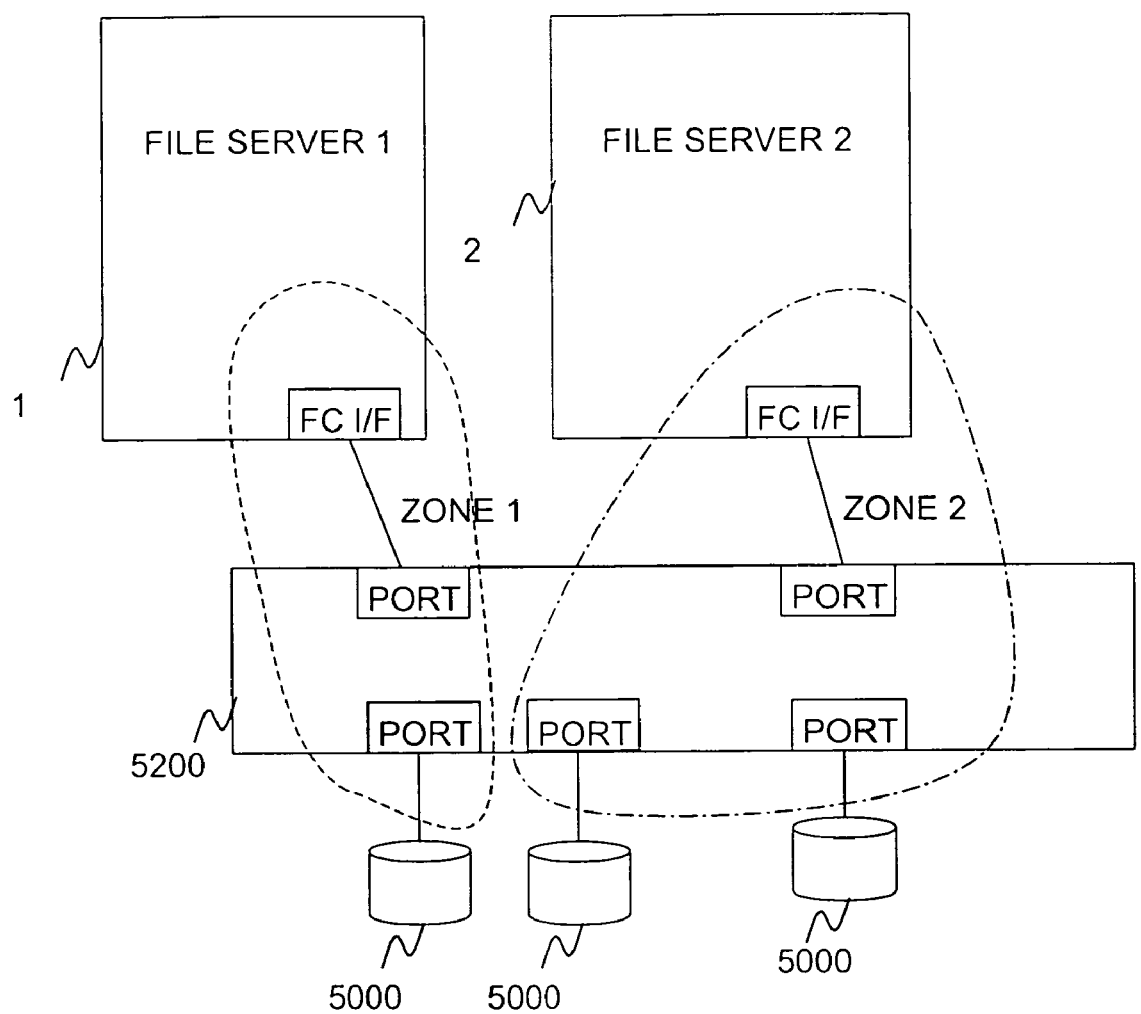
FIG. 12 illustrates redefinition of zones according to one embodiment of the present invention.

The zoning feature provides similar functionality of volume mapping. The access to a given disk may be changed by redefining the zones, as shown in FIG. 12. File server 2 is allowed to access disk 5000*b* by including disk 5000*b* in ZONE 2. File server 1, which is now in a different zone, is not allowed to access disk 5000*b* once the zones have been redefined.

Figure 13:
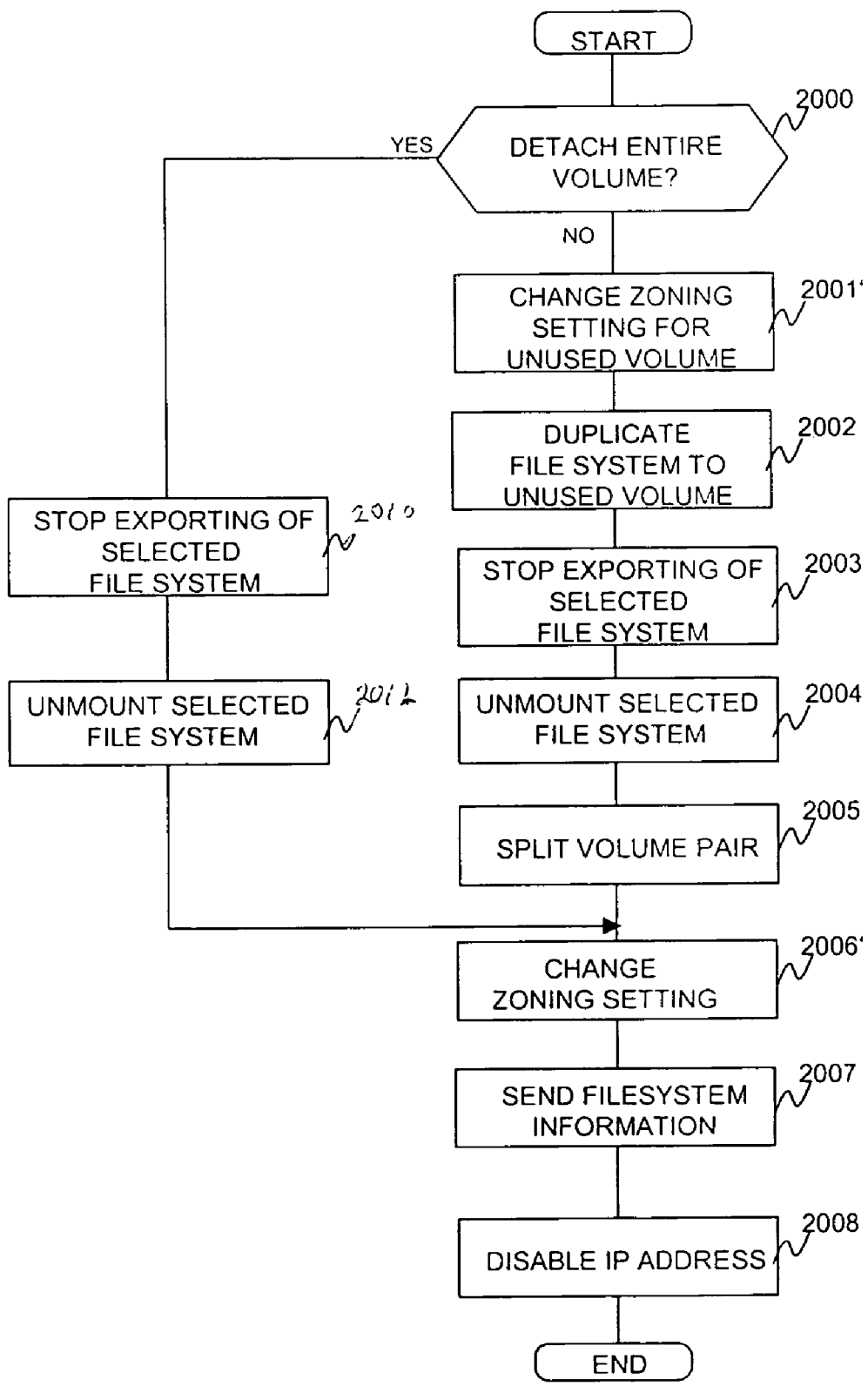
FIG. 13 illustrates a detachment process associated with system according to one embodiment of the present invention.

The file server system 90' performs the load balancing using a process that is similar to that used by system 90. One difference is the detachment operation. FIG. 13 illustrates a detachment process associated with system 90' according to one embodiment of the present invention. System 90' performs steps 2001' and 2006' that is different from steps 2001 and 2006 of the system 90 (see FIG. 7). At step 2001, a switching program of a file server instructs system manager 61 to change the zoning setting of the FC switch 5200, so that file server 1 can access one of the backup logical volumes. At step 2006', the switching program instructs system manager 61 to change the zoning setting, so that file server 2 can access the backup logical volume wherein the copy of the file system resides.

The present invention has been described in terms of specific embodiments to describe the invention and enable those skilled in the art to practice the invention. The embodiments described above may be modified or altered without departing from the scope of the invention. Accordingly, the scope of the invention should be interpreted using the scope of the appended claims.

What is claimed is:

1. A network-attached storage (NAS) system including a housing and coupled to a plurality of clients via a network communication link over which the NAS receives client requests for access to files, the NAS system comprising:
   a first file server provided within the housing of the NAS system and including a first network interface, said first network interface having a first group of Internet Protocol (IP) addresses, said first group including one or more IP addresses;
   a second file server provided within the housing of the NAS
   system and including a second a network interface, said second network interface having a second group of Internet Protocol (IP) addresses, said second group including one or more IP addresses; and
   a storage unit provided within the housing of the NAS system and including a storage area of a first type that is assigned to the first file server and a storage area of a second type that is assigned to the second file server, the storage area of the first type including a plurality of file systems, each file system being associated with an IP address in said first group;
   wherein the storage area of the first type includes at least first, and second, and third file systems which are associated with first, second, and third IP addresses, respectively;
   the NAS system further comprising a system manager that communicates with the network communication link and the storage unit, and receives mapping information from the file systems for the associated IP addresses;
   wherein the first file server detaches the first file system and the first IP address which is associated with said first file system if it is determined that a workload of the first file server is heavy, so that the first file system could not be accessed by the first file server; and
   wherein said first file system is attached to the second file server and said first IP address is assigned to the second network interface, so that the first file system may be accessed via the second file server but not from the first file server.

2. The NAS system of claim 1, wherein the NAS system is a network storage system, the first and second file servers are first and second processors, respectively, provided within the housing of the NAS system.

3. The NAS system of claim 1, wherein the storage unit is a disk array unit which includes a plurality of disks for storing data, wherein a plurality of logical volumes are defined on the disks.

4. The NAS system of claim 3, wherein the plurality of logical volumes includes a backup volume, so that a copy of the first file system to be detached may be stored in the backup volume if the first file system is defined in a logical volume that includes another file system.

5. The NAS system of claim 4, wherein the first file server includes a first file server switching processor and a first resource manager, the first resource manager being configured to maintain a first resource table that provides mapping information,
  wherein the second file server includes a second file server switching processor and a second resource manager, the second resource manager being configured to maintain a second resource table that provides mapping information, and
  wherein the detached first file system is assigned to the second file server by mapping an IP address to the first file system in the second resource table.

6. The NAS system of claim 1, wherein the first file server includes a first file server switching processor and a first resource manager, the first resource manager being configured to maintain a first resource table that provides mapping information,
  wherein the second file server includes a second file server switching processor and a second resource manager, the second resource manager being configured to maintain a second resource table that provides mapping information.

7. The NAS system of claim 1, wherein the first file server includes a first file server switching processor and a first resource manager, the first resource manager being configured to maintain a first resource table that provides mapping information,
  wherein the second file server includes a second file server switching processor and a second resource manager, the second resource manager being configured to maintain a second resource table that provides mapping information, the system further comprising:
  a third file server including a third file server switching processor and a third resource manager,
  wherein the system manger maintains a workload table that includes a first load value, second load value, and third load value for the first, second, and third file servers, respectively,
  wherein the first file system assigned to the first file server is detached from the first file server and attached to the second file server if the first load value indicates that the first file server has the heaviest load of the first, second, and third file servers and the second load value indicates that the second file server has the lightest load of the first, second, and third file servers.

8. The NAS system of claim 7, wherein first file system is detached from the first file server by stopping the exporting of the first file system and unmounting the first file system,
  wherein the detachment of the first file system is initiated if the difference of the first load value and the second load value is greater than a predefined threshold value.

9. The NAS system of claim 8, wherein the exporting of the first file system is stopped by disabling communication between the clients and a network file system of the first file server.

10. The NAS system of claim 8, wherein the first file system is unmounted by disabling communication between a local file system of the first file server and a communication interface associated with the storage area of the first type, which includes the first file system.

11. The NAS system of claim 1, wherein the system manager performs a load balancing operation to balance workload as between the first file server and the second file server.

12. The NAS system of claim 1, wherein the first file server includes a first switcher and a first resource manager, the first resource manager being configured to maintain a first resource table that provides mapping information,
  wherein the second file server includes a second switcher and a second resource manager, the second resource manager being configured to maintain a second resource table that provides mapping information, the system further comprising:
  a third file server including a third switcher and a third resource manager,
  wherein the system manger maintains a workload table that includes a first load value, second load value, and third load value for the first, second, and third file servers, respectively,
  wherein the system manager performs a load balancing operation to balance workload as between the first file server, the second file server, and the third file server.

13. A method for performing load balancing of a storage system of a network-attached storage (NAS) system including first, second, and third processors provided within a housing of the NAS system, the NAS system further including a storage unit having a plurality of logical volumes, the method comprising:
  accessing a workload table maintained by a system manger of a console, the console being coupled to the first, second and third processors via a network communication link, the workload table providing workloads of the first, second, and third processors in the NAS system;
  determining a workload difference between a processor with the heaviest workload and a processor with the lightest workload according to the workload table, the processor with the heaviest workload being the first processor and the processor with the lightest workload being the second processor;
  selecting a first file system associated with the first processor to be detached from the first processor if the workload difference exceeds a given value, the first file system being associated with an Internet Protocol (IP) address comprising mapping information received at the system manager;
  determining whether or not a given logical volume of the storage unit having the first file system to be detached includes aoother file system;
  if the given logical volume does not include another file system,
    stopping the exporting of the first file system to a client that is coupled to the NAS system, and
    unmounting the first file system; and
  if the given logical volume includes another file system,
    providing a copy of the first file system to a backup logical volume, stopping the exporting of the first file system to the client, and unmounting the first file system.

14. The method of claim 13, further comprising:

attaching the first file system to the second processor, so that the first file system may be accessed by the second processor but not from the first processor.

15. The method of claim 14, wherein the attaching step includes:

receiving information on the first file system from the system manger of the console by the second processor, the received information including the IP address of the first file system, updating a resource table of the second processor to map the IP address to the first file system;

enabling the first file system to be accessed by the client via the second processor.

16. The method of claim 15, the enabling step includes mounting the first file system and exporting the first file system.

17. The method of claim 13, wherein the first file system is selected to be detached from the first processor if the system manager determines that moving the first file system from the first processor to the second processor would equalize workloads of the first and second processor more than moving any other file system that is associated with the first processor.

18. The method of claim 13, wherein each processor maintains a resource table that includes workloads of file systems associated with that processor, the method further comprising:

each processor transmitting the workloads of its resource table to the console, so that the system manager may generate the workload table.

19. The method of claim 18, wherein the resource table of each of the processors includes a plurality of IP addresses that are mapped to a plurality of file systems.

20. The method of claim 13, wherein the NAS system is housed in a disk array unit and the processors are provided within a housing of the disk array unit.

21. A network-attached storage (NAS) system including first, second, and third file servers in a housing of the NAS system, a storage unit having a plurality of logical volumes, and a console, the NAS system comprising:

means for accessing a workload table maintained by a system manger of the console, the workload table providing workloads of the first, second, and third file servers in the NAS system;

means for determining a workload difference between a file server with the heaviest workload and a file server with the lightest workload according to the workload table, the file server with the heaviest workload being the first file server and the file server with the lightest workload being the second file server;

means for selecting a first file system associated with the first file server to be detached from the first file server if the workload difference exceeds a given value, the first file system being associated with an Internet Protocol (IP) address;

means for maintaining a mapping table that provides mapping information between the first file system and the IP address;

means for determining whether or not a given logical volume wherein of the storage unit having the first file system to be detached includes another file system;

if the given logical volume does not include another file system, means for stopping the exporting of the first file system to a client that is coupled to the NAS system, and means for unmounting the first file system; and if the given logical volume includes another file system, means for providing a copy of the first file system to a backup logical volume, means for stopping the exporting of the first file system to the client, and means for unmounting the first file system.

22. The NAS system of claim 21, wherein the means for maintaining a mapping table comprises the system manager, which is configured to receive mapping information from the file systems.

* * * * *